United States Patent
Légaré-Vallée et al.

(10) Patent No.: US 9,363,019 B2
(45) Date of Patent: Jun. 7, 2016

(54) MULTIPLE HIGH FREQUENCY BANDS SMALL FORM FACTOR PLUGGABLE RECEIVING UNIT

(71) Applicant: EMBRIONIX DESIGN INC., Laval (CA)

(72) Inventors: Steve Légaré-Vallée, Terrebonne (CA); Renaud Lavoie, Laval (CA)

(73) Assignee: EMBRIONIX DESIGN INC., Laval, QC (CA)

( * ) Notice: Subject to any disclaimer, the term of this patent is extended or adjusted under 35 U.S.C. 154(b) by 35 days.

(21) Appl. No.: 14/245,740

(22) Filed: Apr. 4, 2014

(65) Prior Publication Data
US 2015/0288455 A1    Oct. 8, 2015

(51) Int. Cl.
| | | |
|---|---|---|
| H04B 10/50 | (2013.01) | |
| H04B 10/69 | (2013.01) | |
| H04L 7/00 | (2006.01) | |
| H04B 10/40 | (2013.01) | |
| H04L 25/20 | (2006.01) | |
| H04B 10/67 | (2013.01) | |

(52) U.S. Cl.
CPC ............. *H04B 10/40* (2013.01); *H04B 10/671* (2013.01); *H04B 10/69* (2013.01); *H04L 25/20* (2013.01)

(58) Field of Classification Search
CPC .. H04B 10/501; H04B 10/69; H04B 10/6932; H04L 7/0075

USPC .................................. 398/138, 164, 201, 212
See application file for complete search history.

(56) References Cited

U.S. PATENT DOCUMENTS

| | | | | |
|---|---|---|---|---|
| 7,200,336 | B2 * | 4/2007 | Yu et al. ..................... | 398/135 |
| 8,235,605 | B2 * | 8/2012 | Kim .............................. | 385/92 |
| 2009/0003826 | A1 * | 1/2009 | Jeon et al. ..................... | 398/43 |
| 2010/0119240 | A1 * | 5/2010 | Feng .............................. | 398/202 |
| 2011/0135312 | A1 * | 6/2011 | El-Ahmadi et al. .......... | 398/135 |
| 2011/0150475 | A1 * | 6/2011 | Soto et al. ..................... | 398/63 |
| 2015/0086211 | A1 * | 3/2015 | Coffey et al. ................. | 398/116 |

\* cited by examiner

*Primary Examiner* — Dalzid Singh

(57) ABSTRACT

The present disclosure relates to a small form factor pluggable (SFP) unit for receiving multiple high frequency bands optical signals. The SFP unit comprises an optical connector for receiving an optical signal and means for generating two electrical signals based on the received optical signal. The SFP unit comprises two transimpedance amplifiers (TIAs) operating respectively at two determined ranges of frequencies, for respectively amplifying the first and second electrical signals. The SFP unit comprises a re-clocker for generating a re-clocked electrical signal based on either one of, or a combination of, the first and second amplified electrical signals. The SFP unit comprises a control unit for controlling the operating frequency of the re-clocker based on a determined quality of the re-clocked electrical signal. The SFP unit comprises an electrical connector for outputting the re-clocked electrical signal.

16 Claims, 10 Drawing Sheets

MULTIPLE HIGH FREQUENCY BANDS SMALL FORM FACTOR PLUGGABLE RECEIVING UNIT

TECHNICAL FIELD

The present disclosure relates to the field of small form factor (SFP) pluggable units. More specifically, the present disclosure relates to a SFP unit for receiving multiple high frequency bands optical signals.

BACKGROUND

Small Form-factor Pluggable (SFP) units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, and various other types of electrical connectors. In general, a SFP unit allows connection between an external apparatus, via a front connector of one of the aforementioned types, and internal components of a host system, for example a motherboard or a backplane leading to further components, via a back interface of the SFP unit. Specification no INF-8074i Rev 1.0, entitled "SFP (Small Form factor Pluggable) Transceiver", dated May 12, 2001, available at ftp://ftp.seagate.com/sff/INF-8074.PDF, generally describes sizes, mechanical interfaces, electrical interfaces and identification of SFP units.

The SFF Committee also produced specification no SFF-8431 Rev. 4.1, "Enhanced Small Form Factor Pluggable Module SFP+", dated Jul. 6, 2010. This document, which reflects an evolution of the INF-8074i specification, defines, inter alia, high-speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a host system, the host system in turn exchanging signals with external apparatuses via SFP devices.

Additional signal processing capabilities have been added recently to SFP devices, going beyond their usual connection capabilities. For instance, a SFP device may include re-clocking capabilities, for re-clocking a signal received by the SFP unit, for example a video signal. In the case where the video signal is received via an optical connector, the optical video signal must be transformed into an electrical video signal, prior to being re-clocked. The re-clocking unit integrated in the SFP device re-clocks the received electrical video signal at a specific frequency band.

However, with the emergence in the industry of super high frequency (3-30 GHz) communications systems and very soon extremely high-frequency (30-300 GHz) communication systems, there is a need for a SFP receiving unit adapted for receiving multiple high-frequencies bands optical signals.

SUMMARY

According to a first aspect, the present disclosure provides a small form-factor pluggable (SFP) unit. The SFP unit comprises a housing having specific standardized SFP dimensions and adapted to being inserted into a chassis of a hosting unit. The SFP unit comprises an optical connector on a front panel of the housing for receiving an optical signal. The SFP unit comprises a beam splitter in the housing for splitting the received optical signal into a first and a second optical signal. The SFP unit comprises a first photodiode in the housing for converting the first optical signal into a first electrical signal. The SFP unit comprises a second photodiode in the housing for converting the second optical signal into a second electrical signal. The SFP unit comprises a first transimpedance amplifier (TIA) in the housing operating at a first range of frequencies for amplifying the first electrical signal. The SFP unit comprises a second transimpedance amplifier (TIA) in the housing operating at a second range of frequencies for amplifying the second electrical signal. The SFP unit comprises a re-clocker in the housing for generating a re-clocked electrical signal. The re-clocker re-clocks one of the following: a selection of one of the first or second amplified electrical signals, a combination of the first and second amplified electrical signals, and a selection of one of a first combination of the first and second amplified electrical signals or a second combination of the first and second amplified electrical signals.

In a particular aspect, the SFP unit further comprises a control unit in the housing. The control unit selects an operating frequency. The control unit configures the re-clocker to operate at the selected operating frequency. The control unit determines a quality of the re-clocked electrical signal generated by the re-clocker. The control unit selects a new operating frequency and re-configures the re-clocker to operate at the selected new operating frequency if the quality is not correct. The SFP unit comprises a rear electrical interface on a back panel of the housing for outputting the re-clocked electrical signal.

According to a second aspect, the present disclosure provides a small form-factor pluggable (SFP) unit. The SFP unit comprises a housing having specific standardized SFP dimensions and adapted to being inserted into a chassis of a hosting unit. The SFP unit comprise an optical connector on a front panel of the housing for receiving an optical signal. The SFP unit comprises a photodiode in the housing for converting the received optical signal into a corresponding electrical signal. The SFP unit comprises an electrical signal splitter in the housing for dividing the corresponding electrical signal into a first and a second electrical signals. The SFP unit comprises a first transimpedance amplifier (TIA) in the housing operating at a first range of frequencies for amplifying the first electrical signal. The SFP unit comprises a second transimpedance amplifier (TIA) in the housing operating at a second range of frequencies for amplifying the second electrical signal. The SFP unit comprises a re-clocker in the housing for generating a re-clocked electrical signal. The re-clocker re-clocks one of the following: a selection of one of the first or second amplified electrical signals, a combination of the first and second amplified electrical signals, and a selection of one of a first combination of the first and second amplified electrical signals or a second combination of the first and second amplified electrical signals.

In a particular aspect, the SFP unit comprises a control unit in the housing. The control unit selects an operating frequency. The control unit configures the re-clocker to operate at the selected operating frequency. The control unit determines a quality of the re-clocked electrical signal generated by the re-clocker. The control unit selects a new operating frequency and re-configures the re-clocker to operate at the selected new operating frequency if the quality is not correct.

The SFP unit comprises a rear electrical interface on a back panel of the housing for outputting the re-clocked electrical signal.

According to a third aspect, the present disclosure provides a small form-factor pluggable (SFP) unit. The SFP unit comprises a housing having specific standardized SFP dimensions and adapted to being inserted into a chassis of a hosting unit. The SFP unit comprises an optical connector on a front panel of the housing for receiving an optical signal. The SFP unit comprises an optical to electrical signal converter in the housing for generating a first and second electrical signals based on the received optical signal. The SFP unit comprises a first transimpedance amplifier (TIA) in the housing operating at a first range of frequencies for amplifying the first electrical signal. The SFP unit comprises a second transimpedance amplifier (TIA) in the housing operating at a second range of frequencies for amplifying the second electrical signal. The SFP unit comprises a re-clocker in the housing for generating a re-clocked electrical signal. The re-clocker re-clocks one of the following: a selection of one of the first or second amplified electrical signals, a combination of the first and second amplified electrical signals, and a selection of one of a first combination of the first and second amplified electrical signals or a second combination of the first and second amplified electrical signals. The SFP unit comprises a control unit in the housing. The control unit selects an operating frequency. The control unit configures the re-clocker to operate at the selected operating frequency. The control unit determines a quality of the re-clocked electrical signal generated by the re-clocker. The control unit selects a new operating frequency and re-configures the re-clocker to operate at the selected new operating frequency if the quality is not correct. The SFP unit comprises a rear electrical interface on a back panel of the housing for outputting the re-clocked electrical signal.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Figure 1:
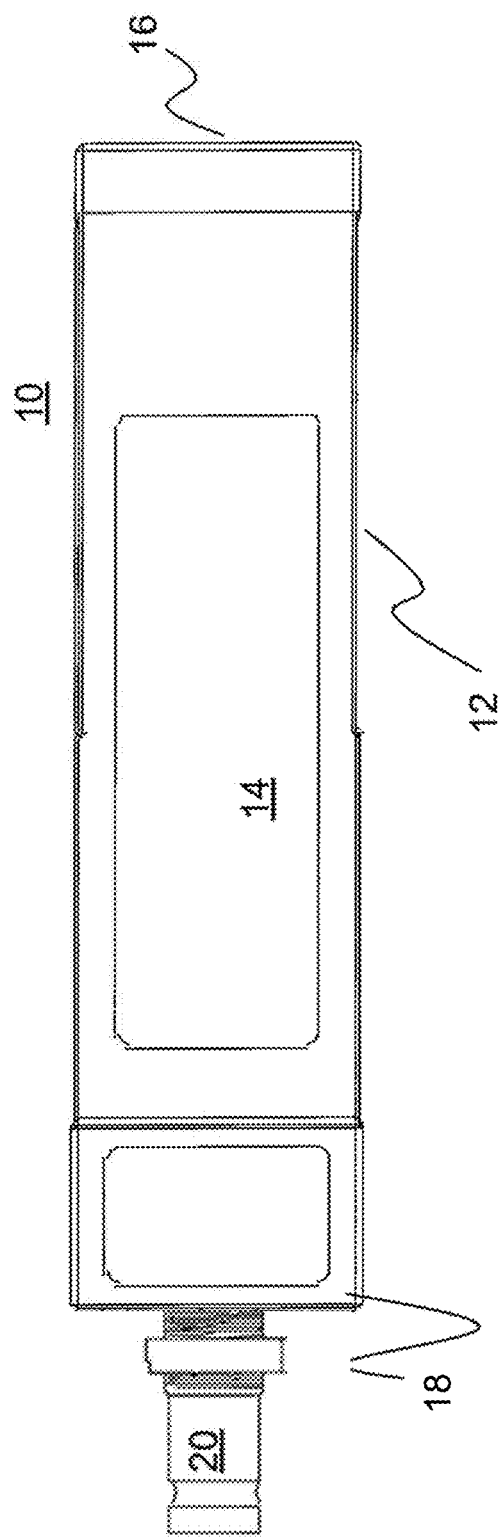
FIG. 1 is a top view of a multi high-frequency bands SFP receiving unit.
Figure 2:
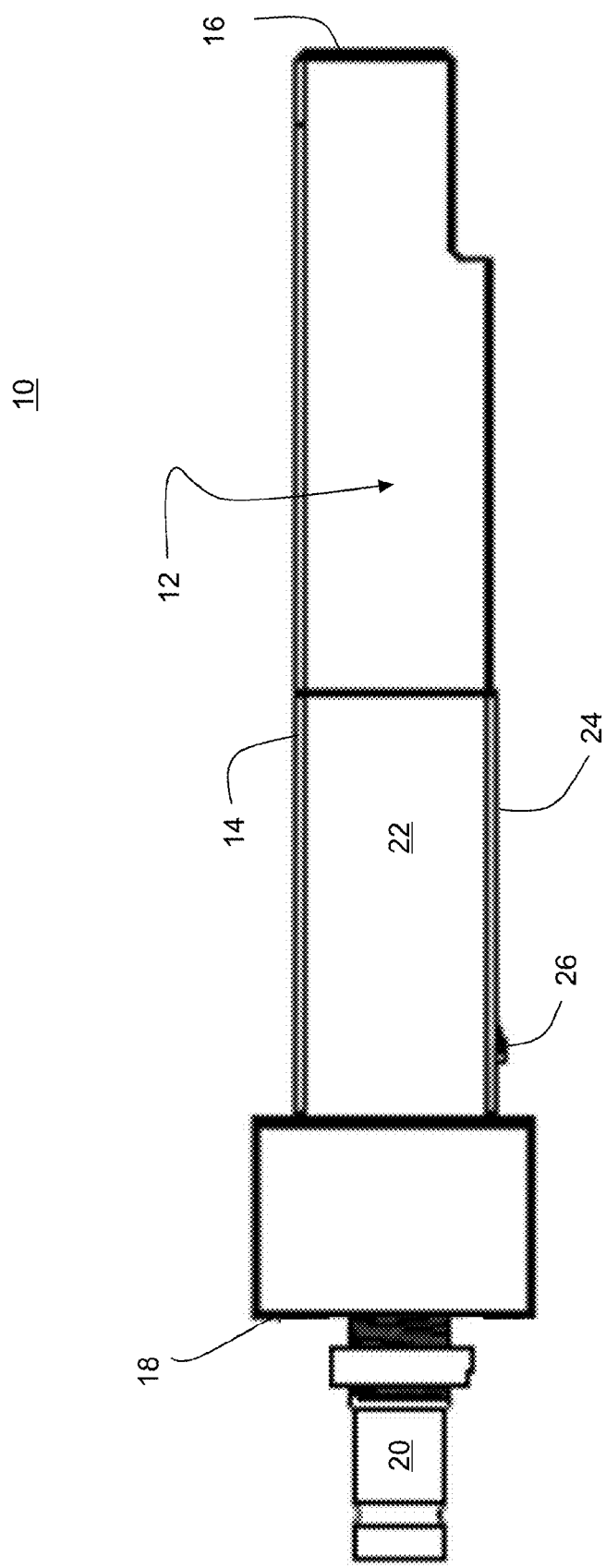
FIG. 2 is a side elevation view of the multi high-frequency bands SFP receiving unit of FIG. 1.
Figure 4:
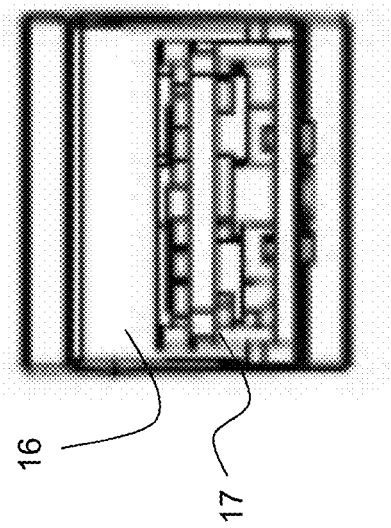
FIG. 4 is back elevation view of the multi high-frequency bands SFP receiving unit of FIG. 1.
Figure 3:
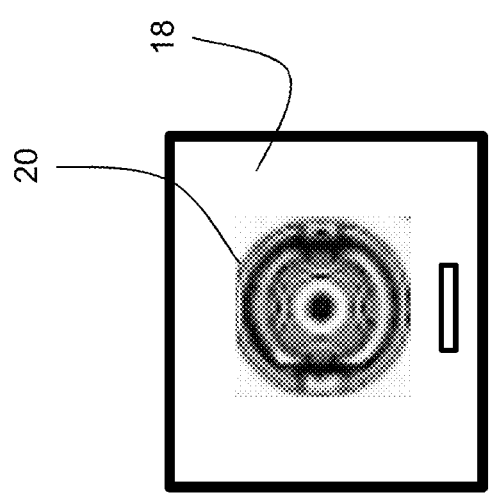
FIG. 3 is a front elevation view of the multi high-frequency bands SFP receiving unit of FIG. 1.
Figure 5:
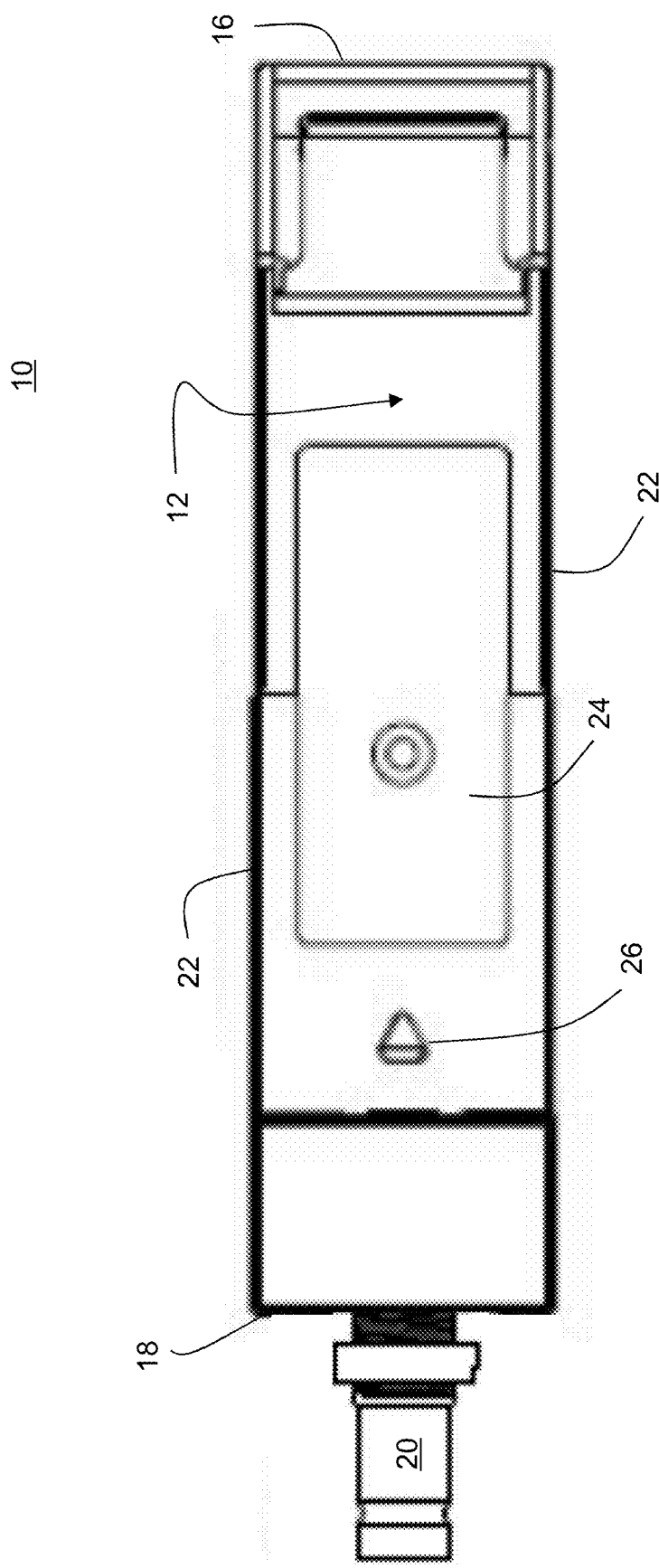
FIG. 5 is a bottom view of the multi high-frequency bands SFP receiving unit of FIG. 1.

The present disclosure describes multi high frequency bands Small Form-factor Pluggable (SFP) receiving units having internal features that far exceed those of conventional units. While conventional units merely provide connection capabilities between a host system in which they are inserted and external apparatuses, the SFP units disclosed herein provide multi high-frequency bands processing capabilities. A signal, for example a video signal, is received at the SFP unit via an optical interface and may have any one of a plurality of high frequency bands (super high frequencies (3-30 GHz) or extremely high frequencies (30-300 GHz)). The multi high-frequency bands SFP receiving unit is capable of adapting to a specific frequency of the received optical (video). The SFP receiving unit performs the conversion of the optical signal into an electrical signal, which is further re-clocked, without the need to resort to any feature of a host system.

The following terminology is used throughout the present disclosure:

SFP: Small Form factor Pluggable, this term refers to units that are insertable into a chassis of a hosting unit; in the present disclosure, a SFP unit complies with an industry standard specification, such as for example SFP, SFP+ and XFP.

Video signal: Analog or digital signal usable for display purposes, either directly on a monitor, or through multicast or broadcast.

Connector: A device component for physically joining circuits carrying electrical, optical, radiofrequency, or like signals with cables, i.e. electrical or optical.

NTSC: National Television System Committee specification for analog television broadcast used in North America and elsewhere.

PAL: Phase Alternating Line specification for analog television broadcast used in Western Europe and elsewhere.

SECAM: Séquentiel couleur à mémoire, French for "Sequential Color with Memory", specification for analog television broadcast used in France, Eastern Europe and elsewhere.

RGB: Red Green Blue color model for video signals, used for example in computer displays; this includes both RGBS, in which horizontal and vertical synchronization are carried on a single (S) wire, and RGBHV, in which horizontal synchronization is carried on a (H) wire and vertical synchronization is carried on a (V) wire.

SDTV: Standard-definition television uses a resolution that is not considered to be either high-definition television (HDTV) or enhanced-definition television (EDTV). The two common SDTV signal types are 576i, with 576 interlaced lines of resolution, derived from the European-developed PAL and SECAM systems.

EDTV: Enhanced-definition television defines formats (e.g. 480p) that deliver a picture superior to that of SDTV, but not as detailed as HDTV.

HDTV: High-definition television defines formats (e.g. 720p, 1080i, and 1080p) that provide a resolution that is substantially higher than that of SDTV and EDTV.

The SFP unit comprises a housing having a front panel, a back panel, a top, a bottom and two sides, and may be fully-compliant or partially compliant with standardized SFP dimensions, such as SFP, XFP (10 Gigabit SFP), Xenpak, or any other standardized small form factor pluggable unit. Consequently, in the context of the present disclosure, a SFP Unit may correspond to SFP, SFP+, XFP or any other known standards related to small form factor pluggable units.

In the present description, the term "video signal" may designate signals compliant with various standards and specifications, including but not limited to a National Television System Committee (NTSC) signal, a Phase Alternating Line (PAL) signal, a Sequential Color with Memory (SECAM) signal, an analog signal of the Red Green Blue (RGB) format, a standard definition television (SDTV) format, an enhanced definition television (EDTV) format and a high definition television (HDTV) format, Serial Digital Interface (SDI), High-Definition SDI, 3G-SDI, etc.

Reference is now made concurrently to FIGS. 1-5, which are, respectively, a top view, a side elevation view, a front elevation view, a back elevation view and a bottom view of a SFP unit 10. The SFP unit 10 comprises a housing 12. The housing defines a top 14, a bottom 24, and two sides 22. The housing 12 may be at least partially of dimensions in compliance with the SFP, SFP+ and/or XFP specifications or having functional dimensions based on the SFP or SFP+ specifications.

The SFP unit 10 further comprises a back panel 16 affixed to the housing 12. The back panel 16 may comprise a rear interface 17, for example an electrical or an optical interface. In an example, the back panel comprises the rear interface 17 suitable to connect the SFP unit to a backplane of a chassis (not shown for clarity purposes), as known to those skilled in the art.

The SFP unit 10 further comprises a front panel 18 affixed to the housing 12. The front panel comprises an optical connector 20, adapted to receive a light signal. The received light signal may be in the ultra-high frequency band (300-3000 MHz), super high frequency band (3-30 GHz) or in extremely high frequency band (30-300 GHz). Furthermore, the received light signal may correspond to a video broadcasting digital signal, a telecommunications digital signal, or any type of digital signal. Additionally, the received light signal may be encoded with any of the specific standards known in the industry, such as for example SDI, HDI, 3G-SDI, 6 GHz, 12 GHz, 24 GHz, 30 GHz, etc. The SFP unit 10 may further comprise an engagement mechanism such as for example a latch 26 as shown in a resting position on the bottom 24, for maintaining the SFP unit 10 in place within a chassis.

Figure 6:
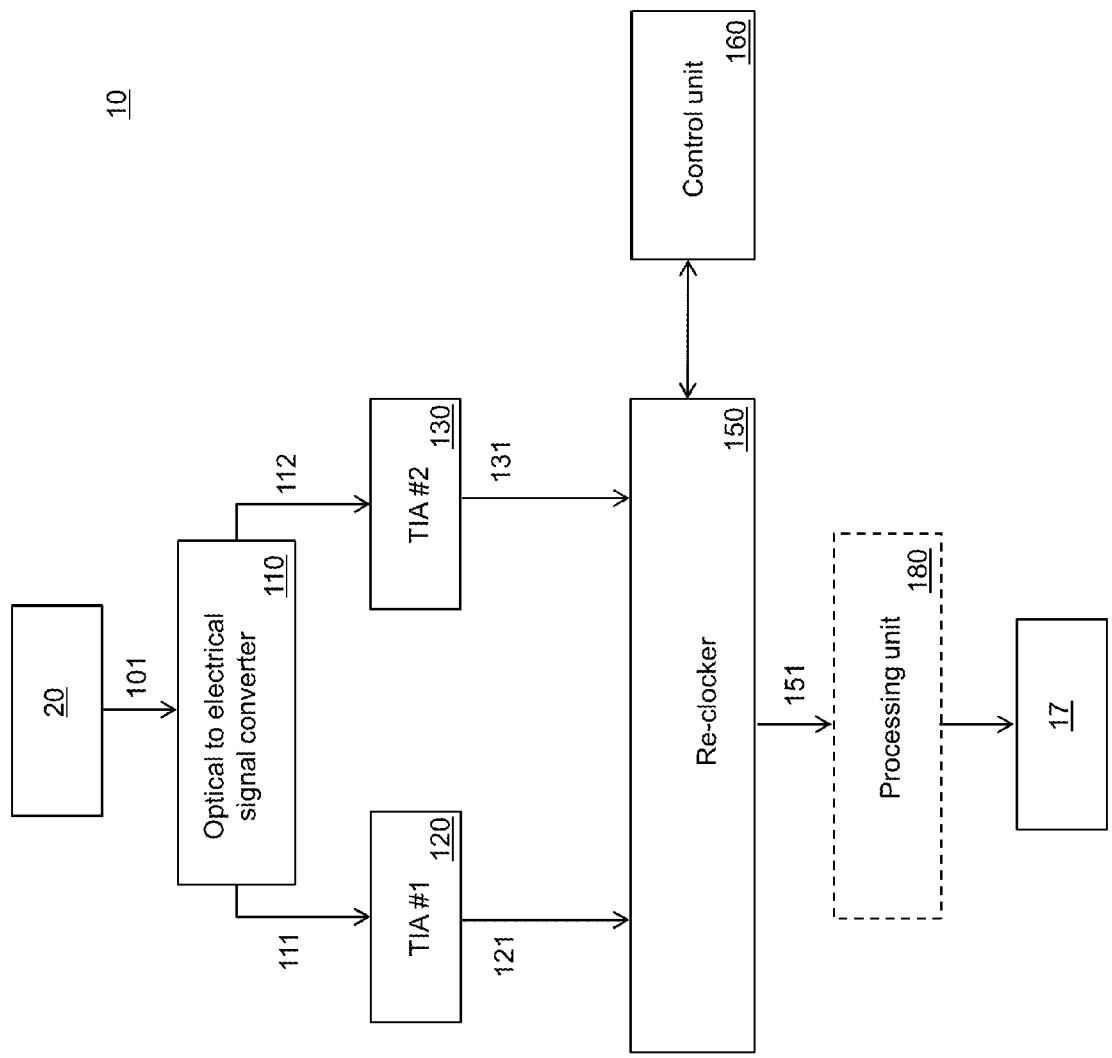
FIG. 6 is a simplified, exemplary block diagram of the multi high-frequency bands SFP receiving unit of FIG. 1.
Figure 7:
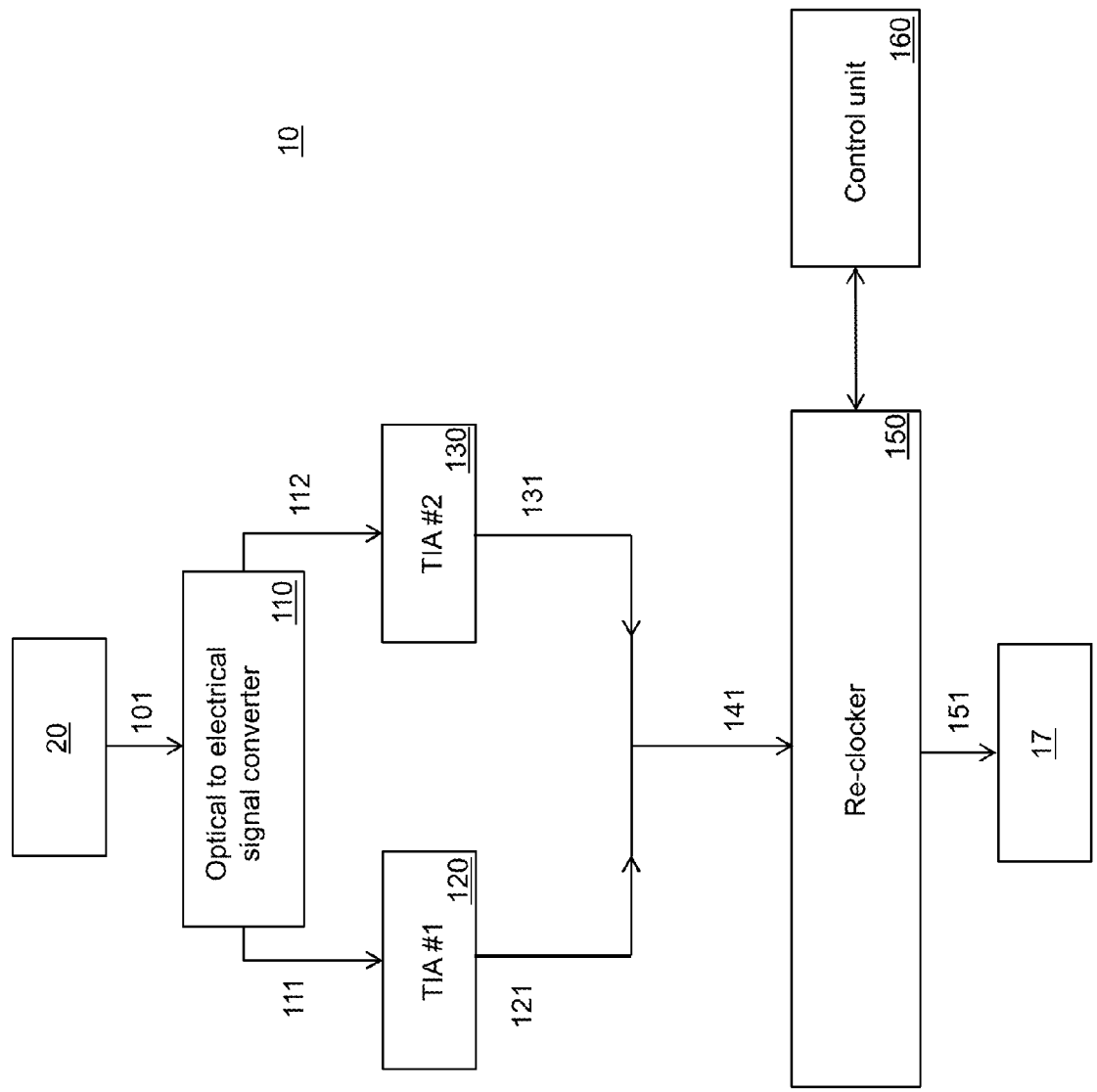
FIG. 7 is a simplified, exemplary block diagram of the multi high-frequency bands SFP receiving unit of FIG. 6, according to another embodiment.
Figure 8:
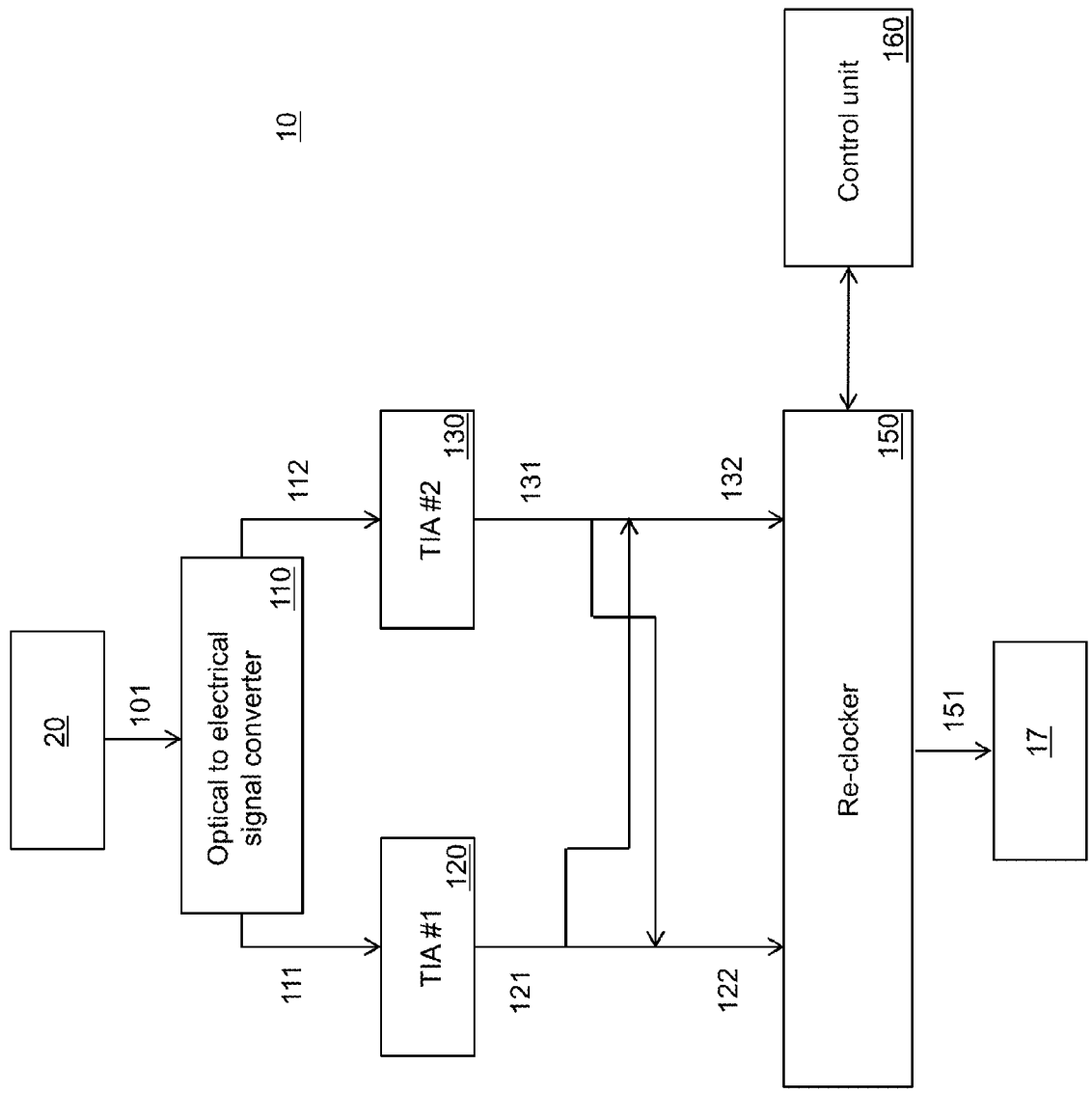
FIG. 8 is a simplified, exemplary block diagram of the multi high-frequency bands SFP receiving unit of FIG. 6, according to still another embodiment.

Reference is now made concurrently to FIGS. 6-8, which show a simplified, exemplary block diagram of the SFP unit 10, adapted for converting a received optical signal to an electrical signal, and for re-clocking the electrical signal. The received optical signal could be a video broadcast signal, a telecommunications signal, or any digital signal that is transmitted at high frequency bands, following an established transmission rate (SDI, HDI, 3G-SDI, 2 GHz, 3 GHz, 6 GHz, 12 GHz, 24 GHz, 30 GHz, etc.

The SFP unit 10 is adapted for the reception and treatment of an optical signal. The SFP unit 10 receives an optical signal 101 via its optical connector 20, and generates therefrom two electrical signals 111 and 112 with similar characteristics. Generation of the two electrical signals 111 and 112 is performed by an optical to electrical signal converter 110. The optical to electrical signal converter 110 will be discussed later in greater detail.

The first electrical signal 111 is amplified by a first transimpedance amplifier (TIA) 120 operating at a first range of frequencies, to generate a first amplified electrical signal 121. The second electrical signal 112 is amplified by a second transimpedance amplifier (TIA) 130 operating at a second range of frequencies, to generate a second amp110lified electrical signal 131.

As will be illustrated later in relation to FIGS. 9A and 9B, the optical to electrical signal converter 110 converts light (optical signal 101) into a current (electrical signals 111 and 112). The TIAs 120 and 130 are used to convert this current into a voltage (electrical signals 121 and 131), by amplifying the input current into the output voltage. When one of the TIAs 120 or 130 operates on an electrical signal having a frequency within its operating range of frequencies, the amplification of the electrical signal is optimal. When one of the TIAs 120 or 130 operates on an electrical signal having a frequency outside its operating range of frequencies, the amplification is reduced, which reduces the quality of the resulting amplified electrical signal.

The SFP unit 10 also comprises a re-clocker 150 and a control unit 160 for controlling the re-clocker 150. In a first embodiment illustrated in FIG. 6, the re-clocker 150 receives the amplified electrical signals 121 and 131, selects one of signals 121 and 131, and generates a re-clocked electrical signal 151 based on the selected one of signals 121 and 131. The selection of one of the signals 121 and 131 is determined by the control unit 160, which configures the re-clocker 150 accordingly.

In a second embodiment illustrated in FIG. 7, the first and second amplified electrical signals 121 and 131 are combined into an electrical signal 141. The re-clocker 150 generates the re-clocked electrical signal 151 based on the combined electrical signal 141. An electrical signal combiner capable of combining the two electrical signals 121 and 131 into the resulting electrical signal 141 is well known in the art, and is not represented in FIG. 7 for simplification purposes.

In a third embodiment illustrated in FIG. 8, a first combined electrical signal 122 is generated by combining the second amplified electrical signal 131 with the first amplified electrical signal 121. A second combined electrical signal 132 is generated by combining the first amplified electrical signal 121 with the second amplified electrical signal 131. The re-clocker 150 receives the combined electrical signals 122 and 132, selects one of signals 122 and 132, and generates the re-clocked electrical signal 151 based on the selected one of signals 122 and 132. The selection of one of the signals 122 and 132 is determined by the control unit 160, which configures the re-clocker 150 accordingly. Electrical signal combiners for generating the combined electrical signals 122 and 132 are not represented in FIG. 8 for simplification purposes.

The re-clocker 150 can operate at different frequencies. A specific frequency is selected by the control unit 160, which configures the re-clocker 150 accordingly. The re-clocked signal 151 generated by the re-clocker 150 has the specific frequency. The role of the control unit 160 is to determine a frequency of the re-clocked signal 151 for which the quality of the signal 151 is correct. For this purpose, the control unit 160 performs the following steps. A first step consists in selecting an operating frequency and configuring the re-clocker 150 to operate at the selected operating frequency. A second step consists in determining a quality of the re-clocked electrical signal 151 generated by the re-clocker 150. A third step consists in selecting a new operating frequency and re-configuring the re-clocker 150 to operate at the selected new operating frequency if the quality is not correct. The second and third steps are repeated until an appropriate frequency is found, for which the quality of the signal 151 is correct. Then, the re-clocker 150 operates continuously at the appropriate frequency, and the control unit 160 continues to monitor the quality of the generated re-clocked signal 151. If the control unit 160 determines that the quality is no longer correct, the sequence of first, second and third steps is repeated.

In the embodiment illustrated in FIG. 6, the control unit 160 selects the input (121 or 131) and the re-clocking frequency of the re-clocker 150. The control unit 160 may implement a state machine consisting of selecting a first input among the two inputs (e.g. 121), testing a set of re-clocking frequencies for the first input, selecting the second one of the two inputs (e.g. 131), and testing the same set of re-clocking frequencies for the second input. The quality of the re-clocked signal 151 generated by the re-clocker 150 is verified by the control unit 160 at each step of the state machine. The execution of the state machine is stopped when the quality of the re-clocked signal 151 is adequate. Then, the re-clocker 150 operates continuously with the input (121 or 131) and the frequency providing the re-clocked signal 151 with the correct quality. The control unit 160 continues to monitor the quality of the generated re-clocked signal 151. If the control unit 160 determines that the quality is no longer correct, the sequence of the state machine is repeated.

In the embodiment illustrated in FIG. 7, the control unit 160 only selects the re-clocking frequency of the re-clocker 150, since the re-clocker has a single input 141. Thus, the control unit 160 may implement a simplified version of the previously described state machine, consisting of testing a set of re-clocking frequencies for the single input 141.

In the embodiment illustrated in FIG. 8, the control unit 160 selects the input (122 or 132) and the re-clocking frequency of the re-clocker 150. Thus, the control unit 160 may implement the same state machine as the one described in relation to FIG. 6. However, the state machine may be optimized as follows: when selecting the input 122, the control unit 160 tests a first set of operating frequencies; and when selecting the input 132, the control unit 160 tests a second complementary set of operating frequencies. For instance, super high frequencies (3-30 GHz) may be tested with the first input 122, and extremely high frequencies (30-300 GHz) with the second input 132. The process of finding the accurate re-clocking frequency can be faster with this state machine optimization.

In order for the SFP unit 10 to operate properly, the range of operating frequencies of the first 120 and second 130 TIAs, as well as the range of re-clocking frequencies selected by the control unit 160, must be selected in accordance with the possible range(s) of frequencies of the input optical signal 101; as will be illustrated in the following examples.

To illustrate the operations of the SFP unit 10, we now consider that the optical signal 101 is either a first signal transmitted at a frequency of 12 GHz (super high frequency), or a second signal transmitted at a frequency of 64 GHz (extremely high frequency). The first TIA 120 provides a gain in the range of 3 to 30 GHz (super high frequencies) and the second TIA 130 amplifies the electrical signal in the range of 30 to 160 GHz (extremely high frequencies). Those skilled in the art will recognize that the operating range of each TIA 120 and 130 is provided for example purposes only, and the same principle can be applied to TIA with narrow and specific frequency ranges, and not only extremely high frequency and super high frequencies. Thus, the first TIA 120 is amplifies the first signal transmitted at a first predetermined transmission rate, while the second TIA 130 is capable of amplifying the second signal transmitted at a second predetermined transmission rate. Furthermore, the control unit 160 has a state machine configured to set a re-clocking frequency in a first range of transmission frequencies (for example: 4 to 24 GHz by increments of 2 GHz), and in a second range of transmission frequencies (for example: 32 to 160 GHz by increments of 16 GHz). The aforementioned operating ranges of frequencies of the TIAs 120 and 130, of the control unit 160, as well as the frequencies of the received optical signals 101, are for illustration purposes only. A person skilled in the art is capable of adapting the TIAs 120 and 130, and the control unit 160, to specific transmission frequencies of the received optical signals 101.

We now consider the embodiment illustrated in FIG. 6. In a first example, we consider that the optical signal 101 is of the first transmission rate, i.e. a frequency of 12 GHz. The quality of the amplified electrical signal 121 treated by the first TIA 120 is not degraded, while the quality of the amplified electrical signal 131 treated by the second TIA 130 is degraded. The state machine of the control unit 160 selects one of the inputs to start its synchronization, i.e. the first input 121, and sequentially sets the re-clocking frequency to pre-determined transmission frequencies in the first range of 4 to 24 GHz for example by increments of 2 GHz. When a re-clocking frequency of 12 GHz is used, the control unit 160 determines that the received optical signal corresponds to a 12 GHz signal, and the sequential setting of the re-clocking is paused. The re-clocker 150 has thus been automatically configured to continuously operate at 12 GHz. The control unit 160 continues to verify the quality of the re-clocked signal, and starts the selection of the inputs and setting of the frequency of the re-clocker until the quality of the re-clocked signal meets the expected quality.

In a second example, the optical signal 101 has the second transmission frequency (i.e. a frequency of 64 GHz). The quality of the amplified electrical signal 121 treated by the first TIA 120 is degraded, while the quality of the amplified electrical signal 131 treated by the second TIA 130 is not degraded. The state machine of the control unit 160 selects the first input 121 and sets re-clocking frequency in the first range of 4 to 24 GHz, for example by increments of 2 GHz, and then in the second range of 32 to 160 GHz by increments 16 GHz. The re-clocked signal 151 is never determined to have a correct quality. Then, the state machine of the control unit 160 selects the second input 131 and sets re-clocking frequency in the first range of 4 to 24 GHz by increments of 2 GHz, and then in the second range of 32 to 160 GHz by increments 16 GHz. With a re-clocking frequency of 64 GHz, the re-clocked signal 151 is determined to have a correct quality and the re-clocker 150 is then configured to continuously operate at 64 GHz.

Reference is now made to the embodiment illustrated in FIG. 7 with the first example, where the optical signal 101 is of the first transmission rate and has a frequency of 12 GHz. The combined electrical signal 141 comprises the amplified electrical signal 121 having a quality not degraded by TIA 120. The state machine of the control unit 160 sets re-clocking frequencies in the first range of 4 to 24 GHz by increments of 2 GHz. With a re-clocking frequency of 12 GHz, the re-clocked signal 151 is determined to have a correct quality and the re-clocker 150 is then configured to continuously operate at 12 GHz.

In the second example, the optical signal 101 is of the second transmission rate and has a frequency of 64 GHz. The combined electrical signal 141 comprises the amplified electrical signal 131 having a quality not degraded by TIA 130. The state machine of the control unit 160 sets re-clocking frequencies in the first range of 4 to 24 GHz by increments of 2 GHz. The re-clocked signal 151 is never determined to have a correct quality. Then, the state machine of the control unit 160 sets re-clocking frequencies in the second range of 32 to 160 GHz by increments of 16 GHz. With a re-clocking frequency of 64 GHz, the re-clocked signal 151 is determined to have a correct quality and the re-clocker 150 is then configured to continuously operate at 64 GHz. In comparison to the embodiment illustrated in FIG. 6, the state machine implemented by the control unit 160 is simpler; but the amplified electrical signals 121 and 131 need to be combined into the input signal 141, which is not the case with the embodiment of FIG. 6.

Turning now to the embodiment illustrated in FIG. 8 with the first example, the optical signal 101 is of the first transmission rate and has a frequency of 12 GHz. The combined electrical signals 122 and 132 both comprise the amplified electrical signal 121 having a quality not degraded by TIA 120. The state machine of the control unit 160 selects the first input 122 and sets re-clocking frequencies only in the first range of 4 to 24 GHz by increments of 2 GHz. With a re-clocking frequency of 12 GHz, the re-clocked signal 151 is determined to have a correct quality and the re-clocker 150 is then configured to continuously operate at 12 GHz.

Comparing now with the second example, the optical signal 101 is of the second transmission rate and has a frequency of 64 GHz. The combined electrical signals 122 and 132 both comprise the amplified electrical signal 131 having a quality not degraded by TIA 130. The state machine of the control unit 160 selects the first input 122 and sets re-clocking frequencies only in the first range of 4 to 24 GHz by increments of 2 GHz. The re-clocked signal 151 is never determined to have a correct quality. Then, the state machine of the control unit 160 selects the second input 132 and sets re-clocking frequencies only in the second range of 32 to 160 GHz by increments 16 GHz. With a re-clocking frequency of 64 GHz, the re-clocked signal 151 is determined to have a correct quality and the re-clocker 150 is then configured to continuously operate at 64 GHz. In comparison to the embodiments illustrated in FIGS. 6 and 7, the state machine implemented by the control unit 160 is capable of determining a proper re-clocking frequency faster; but two electrical signal combiners are needed to generate the combined electrical signals 122 and 132. In order to further optimize the determination of a proper re-clocking frequency, the re-clocker 150 and the control unit 160 may be adapted to test the two ranges of re-clocking frequencies (respectively 4 to 24 GHz and 32 to 160 GHz) in parallel on inputs 122 and 132.

In another example, the optical signal 101 may be of an additional third frequency rate of 300 GHz. Thus, the SFP unit 10 needs to be capable of processing optical signals at three frequencies: 12, 64 and 300 GHz. For this purpose, a third TIA may be added. In this example, the first TIA 120 is operating in the range of 3 to 30 GHz (super high frequencies), the second TIA 130 is operating in the range of 30 to 160 GHz (lower extremely high frequencies), and the third TIA is operating in the range of 160 to 300 GHz (higher extremely high frequencies). The optical to electrical signal converter 110 generates a third electrical signal, which is amplified by the third TIA. In the embodiment illustrated in FIG. 6, the re-clocker 150 has a third input for receiving the third amplified electrical signal, and the state machine of the control unit 160 is adapted accordingly. In the embodiment illustrated in FIG. 7, the re-clocker 150 receives an input 141, which is the combination of the amplified electrical signals 121, 131 and of the third amplified electrical signal; and the state machine of the control unit 160 is adapted accordingly. In the embodiment illustrated in FIG. 8, the re-clocker 150 has a third input and each input receives a combination of the three amplified electrical signals; and the state machine of the control unit 160 is adapted accordingly. It will be apparent to a person skilled in the art that the SFP unit 10 may be further adapted to operate with four, five, etc. TIAs, in order to process a received optical signal 101 having additional possible frequencies.

In another aspect, at least one the TIAs is programmable in frequency, and the operating range of frequencies of the programmable TIA is configured by the control unit 160. For instance, the operating range of frequencies of the TIA (120 and/or 130) is modified by the control unit 160 based on the determined quality of the re-clocked electrical signal 151. For illustrations purposes, the control unit 160 may perform a fine tuning of the TIA 130, which has an operating range of frequencies of 30 to 160 GHz. The state machine executed by the control unit 160 may include a first configuration of the TIA 130 to operate in the range of 30 to 95 GHz, followed by a second configuration of the TIA 130 to operate in the range of 95 to 160 GHz. Thus, for a first optical signal 101 at 64 GHz, the first configuration of the TIA 130 provides a re-clocked signal 151 with a better quality; while for a second optical signal 101 at 112 GHz, the second configuration of the TIA 130 provides a re-clocked signal 151 with a better quality. The TIA 130 being programmable in frequency avoids the usage of two different TIAs operating respectively in the ranges of 30 to 95 GHz and 95 to 160 GHz for obtaining a re-clocked signal 151 with a similar quality.

Figure 11:
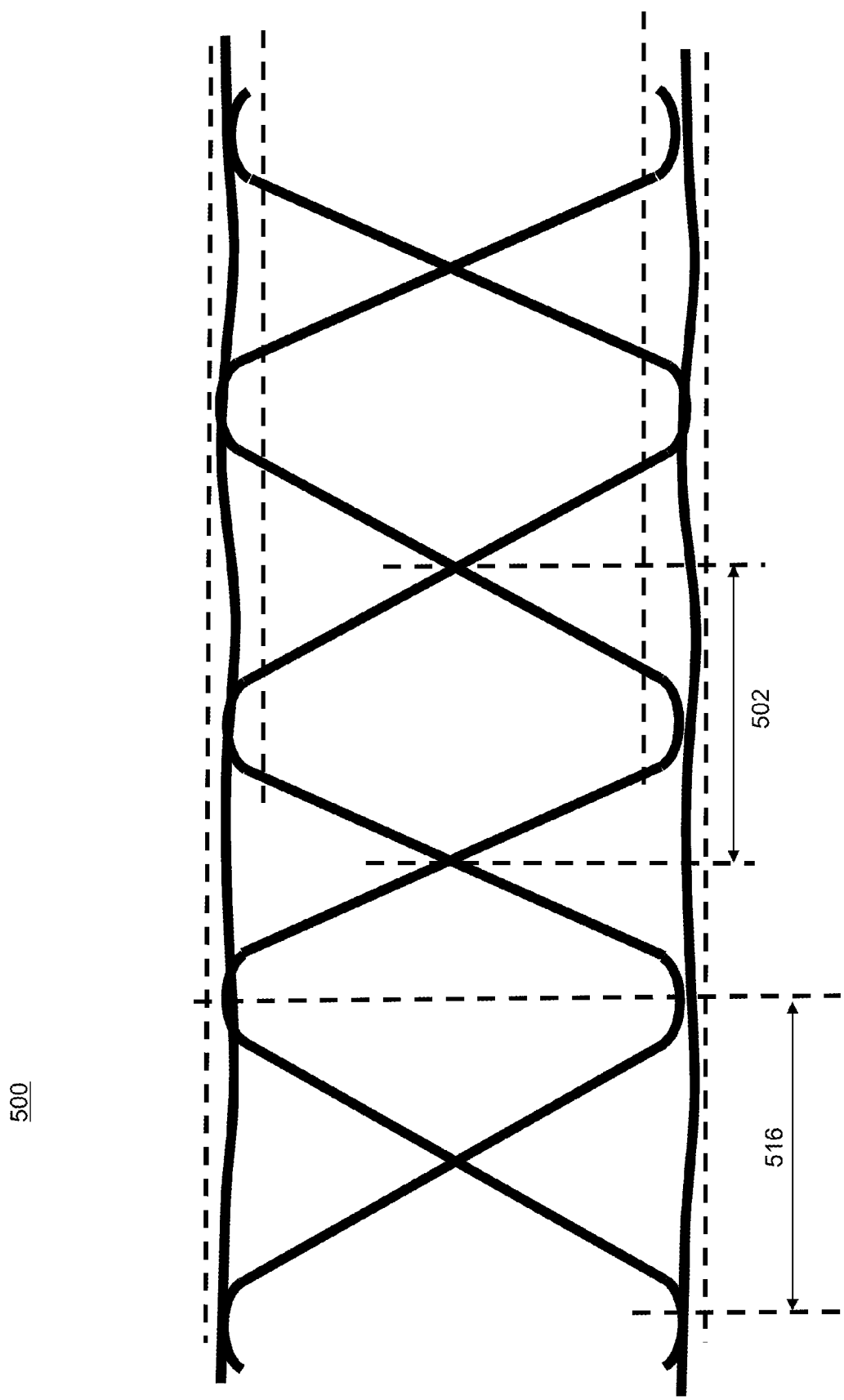
FIG. 11 is an exemplary eye diagram representing a signal with defaults.

Reference is now made concurrently to FIGS. 6, 11 and 12, where FIGS. 11 and 12 respectively show an exemplary eye diagram 400 and 500 of the re-clocked signal 151. As known to those skilled in the art, an eye diagram for a signal may be obtained, for example on a display of an oscilloscope, by inputting the signal to a vertical input of the oscilloscope, using a data rate as a trigger for a horizontal sweep of the oscilloscope.

Figure 10:
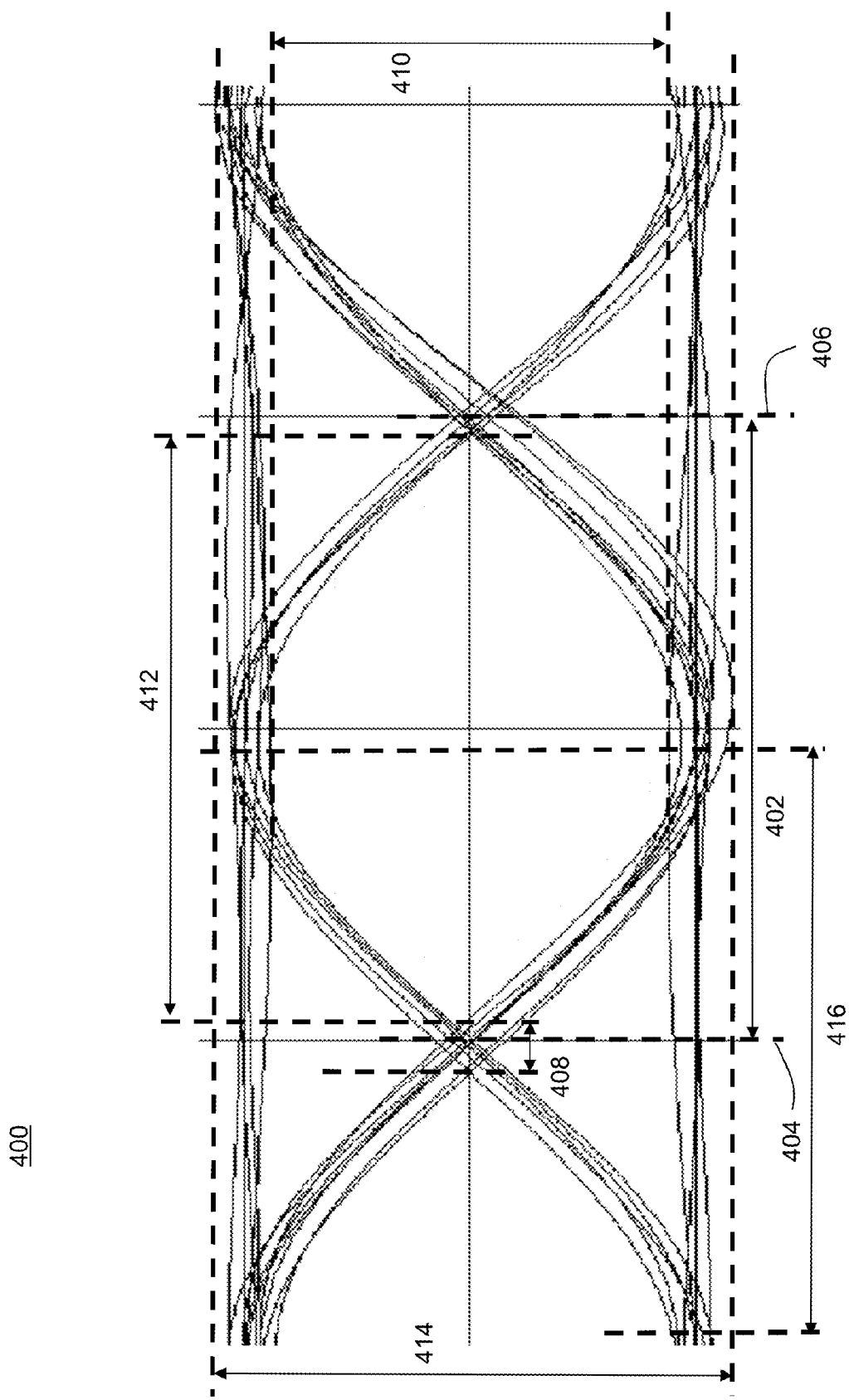
FIG. 10 is an exemplary eye diagram representing a signal without defaults.

The determination of the quality of the re-clocked signal 151 by the control circuit 160 is based on parameters similar to those shown in an eye diagram obtained by using an oscilloscope. As shown in FIG. 10, exemplary parameters of the eye diagram 400 may comprise a data period (or clock rate) 402 defined by ideal transition points 404, 406 between data symbols, and maximum (or peak-to-peak) jitter 408 around transition points 404, 406 (only shown around point 404). Other exemplary parameters comprise vertical eye opening 410, horizontal eye opening 412, maximum signal amplitude 414, signal rise duration 416, overshoot and undershoot at the edges of the signals and like signal characteristics.

FIG. 10 illustrates the eye diagram 400 of a re-clocked signal 151 having a good quality. For instance, the original optical signal 101 had a frequency of 24 GHz and the corresponding electrical signal was re-clocked at a frequency of 24 GHz by the re-clocker 150 to generate the re-clocked electrical signal 151.

FIG. 11 illustrates the eye diagram 500 of a re-clocked signal 151 having a poor quality. For instance, the original optical signal 101 had a frequency of 48 GHz and the corresponding electrical signal was re-clocked at a frequency of 24 GHz by the re-clocker 150 to generate the re-clocked electrical signal 151.

The data period 402 defined by the ideal transition points 404, 406 in the eye diagram 400 corresponds to a signal having a frequency of 24 GHz, and which can be properly re-clocked by a re-clocking frequency of 24 GHz. The corresponding data period 502 in the eye diagram 500 is twice shorter and corresponds to a signal having a frequency of 48 GHz, which cannot be properly re-clocked by a re-clocking frequency of 24 GHz.

Similarly, the signal rise duration 416 of the re-clocked signal 151 in the eye diagram 400 has a value corresponding to a signal having a frequency of 24 GHz. The corresponding signal rise duration 516 of the re-clocked signal 151 in the eye diagram 500 is twice shorter and corresponds to a signal having a frequency of 48 GHz, which cannot be properly re-clocked by a re-clocking frequency of 24 GHz.

The data period and the signal rise duration are exemplary parameters, which can be extracted from the re-clocked signal 151, and analyzed by the control unit 160 to determine the quality of the re-clocked signal 151. The analysis performed by the control unit 160 may be based on a single one of these two exemplary parameters, or on these two exemplary parameters in combination. Additional parameters may also be extracted from the re-clocked signal 151 to determine its quality, as will be apparent to a person skilled in the art. The extraction of the parameters from the re-clocked signal 151 may be performed by the re-clocker 150, and the extracted parameters are transmitted to the control unit 160 for analysis and signal quality determination. Alternatively, the extraction of the parameters from the re-clocked signal 151 and their analysis for signal quality determination may be performed by the control unit 160.

The control unit 160 may comprise a processor and a memory (not represented in the Figures), the processor executing control software stored in the memory, for controlling the re-clocker 150 and determining the quality of the re-clocked signal 151. For example, the control software may implement the aforementioned state machine. Alternatively, the control unit 160 may comprise a field programmable gate arrays (FPGAs) or an application specific integrated circuits (ASIC) for implementing the aforementioned state machine.

Figure 9B:
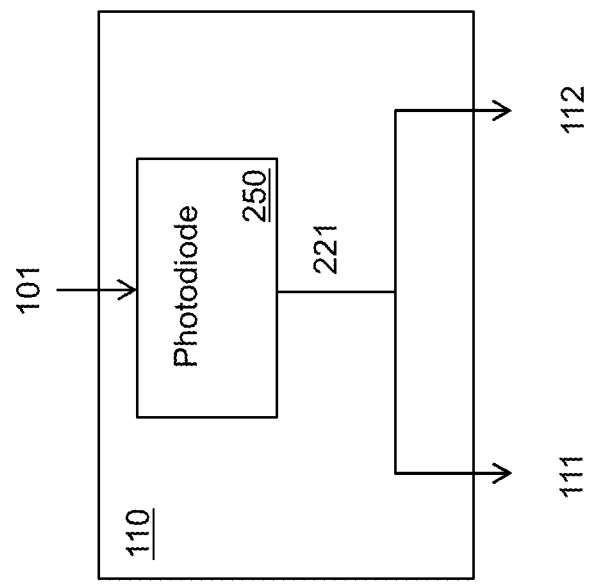
FIGS. 9A and 9B are simplified, exemplary block diagrams of optical to electrical signal converter configurations.
Figure 9A:
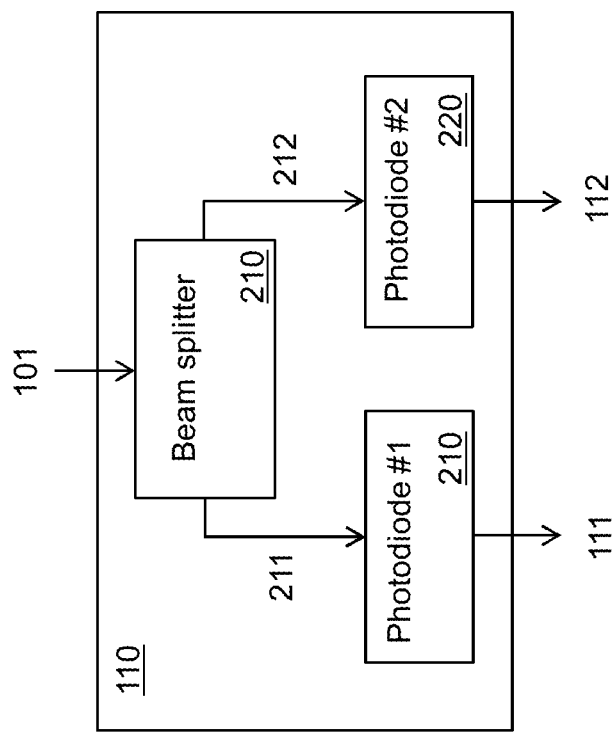

Referring now to FIG. 9A, a first embodiment of the optical to electrical signal converter 110 is illustrated. A beam splitter 210 receives the optical signal 101 and generates two optical signals 211 and 212 with similar characteristics. The first optical signal 211 is converted into a current corresponding to the electrical signal 111 by a first photodiode 210. The second optical signal 212 is converted into a current corresponding to the electrical signal 112 by a second photodiode 220. The beam splitter 210 may consist of a mirror, a lens, a set or mirrors, etc.

Referring now to FIG. 9B, a second embodiment of the optical to electrical signal converter 110 is illustrated. The optical signal 101 is converted into a current by a photodiode 250 to generate an electrical signal 221. The electrical signal 221 is then divided into the two electrical signals 111 and 112 by an electrical signal splitter. An electrical signal splitter capable of dividing the electrical signal 221 into the two resulting electrical signals 111 and 112 is well known in the art, and is not represented in FIG. 9B for simplification purposes.

Referring back to FIG. 6, the re-clocked electrical signal 151 is outputted via the rear interface 17 on the back panel of the housing of the SFP unit 10. In an alternative to the rear interface 17, the re-clocked electrical signal 151 may be outputted via an electrical interface on the front panel of the housing of the SFP unit 10 (not represented in FIGS. 1-5).

The SFP unit 10 may also include an additional processing unit 180, for treating the re-clocked electrical signal 151, before outputting it via the rear interface 17.

The processing unit 180 may comprise processing means (such as a processor, a field programmable gate arrays (FPGAs), an application specific integrated circuits (ASIC), etc.) for performing one of the following treatments on the re-clocked electrical signal 151: filtering, emphasizing, de-emphasizing, de-aliasing, etc.

In the interest of clarity, not all of the routine features of the implementations of the SFP unit and of the re-clocking system are shown and described. It will, of course, be appreciated that in the development of any such actual implementation of the SFP unit or re-clocking system, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of signal conversion having the benefit of the present disclosure.

In accordance with the present disclosure, the components, described herein may be implemented using various types of hardwired devices, field programmable gate arrays (FPGAs), application specific integrated circuits (ASICs), or the like.

Systems and modules described herein may comprise software, firmware, hardware, or any combination(s) of software, firmware, or hardware suitable for the purposes described herein.

Although the present disclosure has been described hereinabove by way of non-restrictive, illustrative embodiments thereof, these embodiments may be modified at will within the scope of the appended claims.

What is claimed is:

1. A small form-factor pluggable (SFP) unit comprising:
   a housing having specific standardized SFP dimensions and adapted to being inserted into a chassis of a hosting unit;
   an optical connector on a front panel of the housing for receiving an optical signal;
   a beam splitter in the housing for splitting the received optical signal into a first and a second optical signal;
   a first photodiode in the housing for converting the first optical signal into a first electrical signal;
   a second photodiode in the housing for converting the second optical signal into a second electrical signal;
   a first transimpedance amplifier (TIA) in the housing operating at a first range of frequencies for amplifying the first electrical signal;
   a second transimpedance amplifier (TIA) in the housing operating at a second range of frequencies for amplifying the second electrical signal; and
   a re-clocker, configured by a controller, in the housing for generating a re-clocked electrical signal by re-clocking one of the following: a selection of one of the first or second amplified electrical signals, a combination of the first and second amplified electrical signals, and a selection of one of a first combination of the first and second amplified electrical signals or a second combination of the first and second amplified electrical signals.

2. The SFP unit of claim 1, further comprising a control unit in the housing for:
   selecting an operating frequency,
   configuring the re-clocker to operate at the selected operating frequency,
   determining a quality of the re-clocked electrical signal generated by the re-clocker, and
   selecting a new operating frequency and re-configuring the re-clocker to operate at the selected new operating frequency if the quality is not correct; and
   a rear electrical interface on a back panel of the housing for outputting the re-clocked electrical signal.

3. The SFP unit of claim 2, wherein the control unit further configures the re-clocker to select one of the first or second amplified electrical signals for re-clocking.

4. The SFP unit of claim 2, wherein the control unit further configures the re-clocker to select one of the first combination of the first and second amplified electrical signals or the second combination of the first and second amplified electrical signals for re-clocking.

5. The SFP unit of claim 2, comprising:
a third photodiode in the housing for converting a third optical signal into a third electrical signal, the third optical signal being generated by the beam splitter from the received optical signal;
a third TIA in the housing operating at a third range of frequencies for amplifying a third electrical signal; and
wherein the re-clocker generates the re-clocked electrical signal by re-clocking one of the following: a selection of one of the first, second or third amplified electrical signals, a combination of the first, second and third amplified electrical signals, and a selection of one of a first combination of the first, second and third amplified electrical signals, a second combination of the first, second and third amplified electrical signals, and a third combination of the first, second and third amplified electrical signals.

6. A small form-factor pluggable (SFP) unit comprising:
a housing having specific standardized SFP dimensions and adapted to being inserted into a chassis of a hosting unit;
an optical connector on a front panel of the housing for receiving an optical signal;
a photodiode in the housing for converting the received optical signal into a corresponding electrical signal;
an electrical signal splitter in the housing for dividing the corresponding electrical signal into a first and a second electrical signals;
a first transimpedance amplifier (TIA) in the housing operating at a first range of frequencies for amplifying the first electrical signal;
a second transimpedance amplifier (TIA) in the housing operating at a second range of frequencies for amplifying the second electrical signal;
a re-clocker in the housing for generating a re-clocked electrical signal by re-clocking one of the following: a selection of one of the first or second amplified electrical signals, a combination of the first and second amplified electrical signals, and a selection of one of a first combination of the first and second amplified electrical signals or a second combination of the first and second amplified electrical signals;
a control unit in the housing for:
selecting an operating frequency,
configuring the re-clocker to operate at the selected operating frequency,
determining a quality of the re-clocked electrical signal generated by the re-clocker, and
selecting a new operating frequency and re-configuring the re-clocker to operate at the selected new operating frequency if the quality is not correct; and
a rear electrical interface on a back panel of the housing for outputting the re-clocked electrical signal.

7. The SFP unit of claim 6, wherein the received optical signal is a video signal.

8. The SFP unit of claim 6, wherein the control unit further configures the re-clocker to select one of the first or second amplified electrical signals for re-clocking.

9. The SFP unit of claim 6, wherein the control unit further configures the re-clocker to select one of the first combination of the first and second amplified electrical signals or the second combination of the first and second amplified electrical signals for re-clocking.

10. The SFP unit of claim 6, comprising a third TIA in the housing operating at a third range of frequencies for amplifying a third electrical signal, wherein the electrical signal splitter divides the corresponding electrical signal into the first, second and third electrical signals, and wherein the re-clocker generates the re-clocked electrical signal by re-clocking one of the following: a selection of one of the first, second or third amplified electrical signals, a combination of the first, second and third amplified electrical signals, and a selection of one of a first combination of the first, second and third amplified electrical signals, a second combination of the first, second and third amplified electrical signals, and a third combination of the first, second and third amplified electrical signals.

11. A small form-factor pluggable (SFP) unit comprising:
a housing having specific standardized SFP dimensions and adapted to being inserted into a chassis of a hosting unit;
an optical connector on a front panel of the housing for receiving an optical signal;
an optical to electrical signal converter in the housing for generating a first and a second electrical signals based on the received optical signal;
a first transimpedance amplifier (TIA) in the housing operating at a first range of frequencies for amplifying the first electrical signal;
a second transimpedance amplifier (TIA) in the housing operating at a second range of frequencies for amplifying the second electrical signal;
a re-clocker in the housing for generating a re-clocked electrical signal by re-clocking one of the following: a selection of one of the first or second amplified electrical signals, a combination of the first and second amplified electrical signals, and a selection of one of a first combination of the first and second amplified electrical signals or a second combination of the first and second amplified electrical signals;
a control unit in the housing for:
selecting an operating frequency,
configuring the re-clocker to operate at the selected operating frequency,
determining a quality of the re-clocked electrical signal generated by the re-clocker, and
selecting a new operating frequency and re-configuring the re-clocker to operate at the selected new operating frequency if the quality is not correct; and
an electrical connector for outputting the re-clocked electrical signal.

12. The SFP unit of claim 11, wherein the received optical signal is a video signal.

13. The SFP unit of claim 11, wherein the control unit further configures the re-clocker to select one of the first or second amplified electrical signals for re-clocking.

14. The SFP unit of claim 13, further comprising a processing unit in the housing for treating the re-clocked electrical signal before outputting it via the electrical connector.

15. The SFP unit of claim 11, wherein the control unit further configures the re-clocker to select one of the first combination of the first and second amplified electrical signals or the second combination of the first and second amplified electrical signals for re-clocking.

16. The SFP unit of claim 11, comprising a third TIA in the housing operating at a third range of frequencies for amplifying a third electrical signal, wherein the optical to electrical signal converter generates the third electrical signal based on the received optical signal, and wherein the re-clocker generates the re-clocked electrical signal by re-clocking one of the following: a selection of one of the first, second or third amplified electrical signals, a combination of the first, second and third amplified electrical signals, and a selection of one of a first combination of the first, second and third amplified electrical signals, a second combination of the first, second and third amplified electrical signals, and a third combination of the first, second and third amplified electrical signals.

\* \* \* \* \*